United States Patent

Matsumoto

[11] Patent Number: 5,987,416
[45] Date of Patent: *Nov. 16, 1999

[54] ELECTRONIC COMMUNITY SYSTEM USING SPEECH RECOGNITION FOR USE BY THE VISUALLY IMPAIRED

[75] Inventor: Tatsuro Matsumoto, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/518,714

[22] Filed: Aug. 24, 1995

[30] Foreign Application Priority Data

Jan. 11, 1995 [JP] Japan ................................. 7-002902

[51] Int. Cl.$^6$ .................................................. G10L 3/00
[52] U.S. Cl. .......................................... 704/275; 704/270
[58] Field of Search ................... 395/2.09, 2.69, 395/2.79, 2.84; 379/202

[56] References Cited

U.S. PATENT DOCUMENTS

| | | | |
|---|---|---|---|
| 4,624,012 | 11/1986 | Lin et al. ................................ | 395/2.69 |
| 4,907,274 | 3/1990 | Nomura et al. ........................ | 395/2.79 |
| 4,975,957 | 12/1990 | Ichikawa et al. ...................... | 395/2.69 |
| 4,985,697 | 1/1991 | Boulton .................................. | 340/750 |
| 5,086,385 | 2/1992 | Launey et al. ......................... | 395/2.79 |
| 5,208,745 | 5/1993 | Quentin et al. ........................ | 364/188 |
| 5,278,943 | 1/1994 | Gasper et al. ......................... | 395/2.09 |
| 5,347,306 | 9/1994 | Nitta ....................................... | 348/15 |
| 5,491,743 | 2/1996 | Shiio et al. ............................. | 379/202 |
| 5,519,809 | 5/1996 | Husseiny et al. ...................... | 395/2.84 |

FOREIGN PATENT DOCUMENTS 3-196242  8/1991  Japan .
5-176073  7/1993  Japan .

*Primary Examiner*—David R. Hudspeth
*Assistant Examiner*—Michael N. Opsasnick
*Attorney, Agent, or Firm*—Staas & Halsey

[57] ABSTRACT

In an electronic community system, host and user terminals are connected so that a virtual space shared by the user terminals is formed based on information transmitted from the host to the user terminals, a state and events in the virtual space being controlled in accordance with commands input to the respective user terminals. The electronic community system includes a first unit, at least provided in one of the host and the respective user terminals, for analyzing commands input to the respective user terminals and generating information representing at least one of states and events in the virtual space. The system further includes a second unit is provided in either the host or the respective user terminals, for converting the information generated by the first unit into speech information, and a speech output unit, provided in the respective user terminals, for outputting a speech explaining the states and/or events in the virtual space based on the speech information obtained by the second unit. Speech recognition is used in the electronic community system so as to allow users who are visually impaired to use the system.

9 Claims, 9 Drawing Sheets

ELECTRONIC COMMUNITY SYSTEM USING SPEECH RECOGNITION FOR USE BY THE VISUALLY IMPAIRED

BACKGROUND OF THE INVENTION (1) Field of the Invention

The present invention generally relates to an electronic community system and more particularly to an electronic community system in which communication among users is performed using virtual characters in a virtual space formed on a computer network.

(2) Description of the Related Art

Conventionally, electronic community systems using a personal computer communication system have been proposed. In the electronic community systems, a virtual space is formed on a computer network and displayed on user terminals. Users operate, by use of a mouse, characters (hereinafter each of characters is referred to as an "abator") in the virtual space displayed on the user terminals, the virtual having a plurality of objects. An "abator" operated by a user communicates with "abators" operated by other users in the virtual space so that services prepared in the system are available for users.

Figure 1:
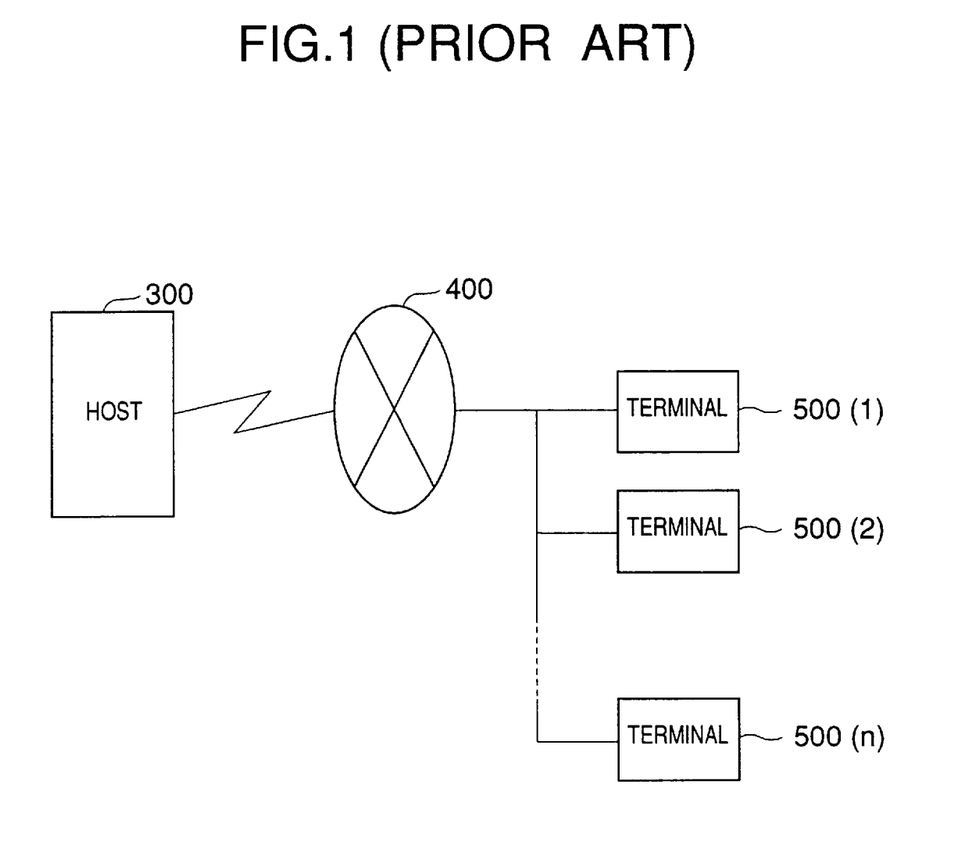
FIG. 1 is a block diagram illustrating a communication system in which an electronic community system is formed.

A communication system in which the electronic community system is formed has a structure as shown in FIG. 1.

Referring to FIG. 1, a service center is provided with a host computer (hereinafter referred to as a host) 300 formed of one or a few workstations. A plurality of user terminals 500(1), 500(2), . . . , 500(n), to which services prepared in the electronic community system are supplied, are connected to the host 300 by a communication network 400. The host 300 carries out management for the electronic community system and users. In a user terminal 500 (i), a user performs an operation for logging the user into the host 300 (a log-in operation), and accesses a virtual space formed by the host 300. The host 300 and the user terminal 500 (hereinafter, the respective user terminals 500(1), 500(2), . . . , 500(n) are generally referred to as the user terminal 500) are formed as shown in FIG. 2.

Figure 2:
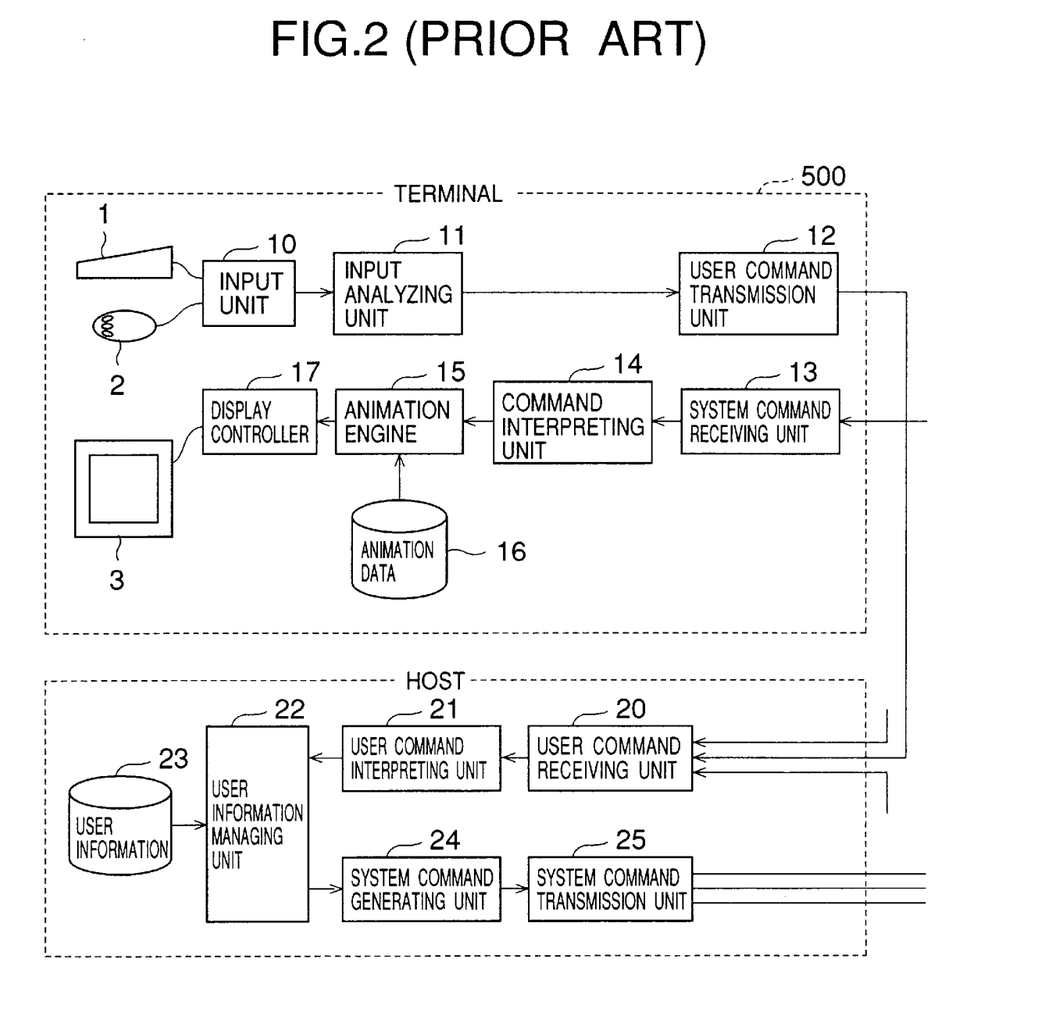
FIG. 2 is a block diagram illustrating structures of a host and a user terminal in a conventional electronic community system.
Figure 3:
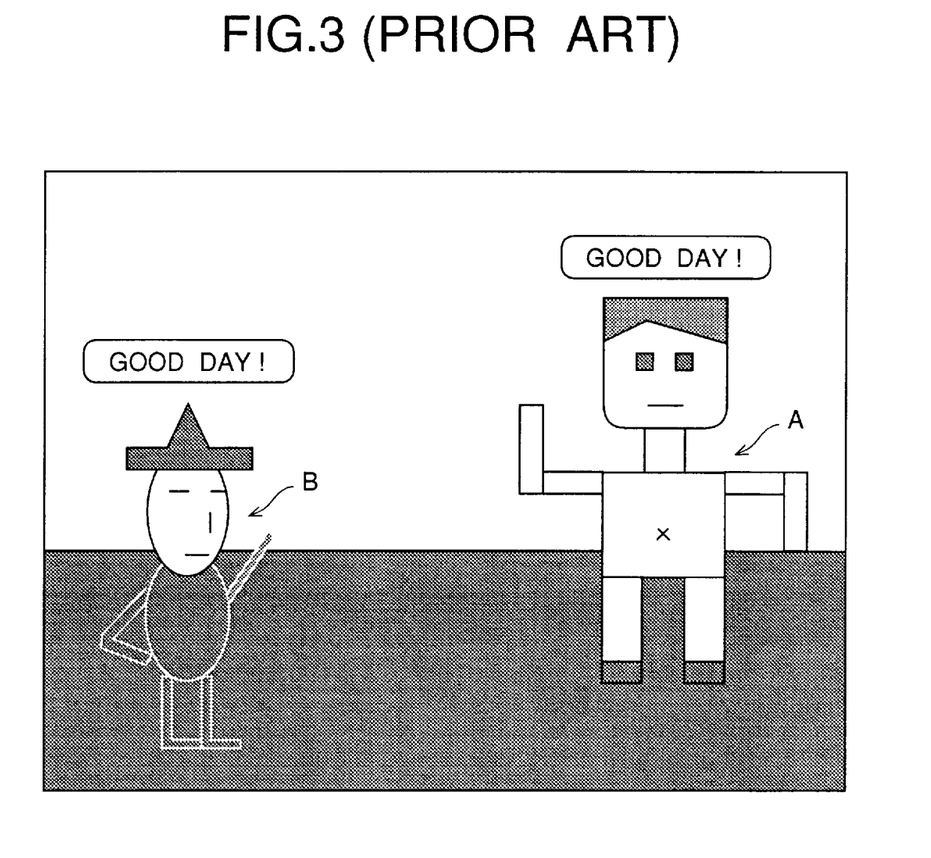
FIG. 3 is a diagram illustrating an example of a virtual space displayed on a display unit in the conventional electronic community system.

Referring to FIG. 2, the user terminal 500 has a keyboard 1, a mouse 2, a display unit 3, an input unit 10, an input analyzing unit 11, a user command transmission unit 12, a system command receiving unit 13, a command interpreting unit 14, an animation engine 15, an animation database 16 and a display controller 17. The host 300 has a user command receiving unit 20, a user command interpreting unit 21, a user information managing unit 22, a user information database 23, a system command generating unit 24 and a system command transmission unit 25. A virtual space formed by the host 300 is displayed on the display unit 3 of the user terminal 500, as shown in FIG. 3. In the virtual space, "abators" A and B are moved and talk with each other (talking sentences are displayed) in accordance with input information supplied from the respective user terminals.

When a user operates the mouse 2 and performs an input operation using the keyboard 1 to control the "abator" A or B in a user terminal 500 (i), input information depending on these operations is supplied to the input analyzing unit 11 via the input unit 10. The input analyzing unit 11 analyzes the input information. That is, it is determined whether or not the input information is information for controlling a moment, whether or not the input information is information regarding talking sentences, whether or not the input information is information for identifying functions and the like. Analyzed user commands (the input information) are transmitted from the user command transmission unit 12 to the host 300 via the communication network 400.

In the host 300, the user command receiving unit 20 receives the user commands from the respective user terminals, and the user commands are then supplied to the user command interpreting unit 21. The user command interpreting unit 21 analyzes contents of the user commands supplied from the user command receiving unit 20. The analyzing results are supplied to the user information managing unit 22. The user information managing unit 22 checks, with reference to the user information database 23, whether the analyzing results include contradictions. If the analyzing results include no contradiction, the analyzing results are supplied to the system command generating unit 24. The system command generating unit 24 generates, based on the analyzing results, system commands indicating how the "abators" A and B are controlled. Each of the system commands may include information indicating positions and moving directions of a virtual character "abator", information for controlling movement of the virtual character "abator" and the like. The system commands generated by the system command generating unit 24 are serially transmitted from the system command transmission unit 25 to the user terminal 500 via the communication network 400.

Furthermore, in the user terminal 500, the system command receiving unit 13 receives the commands from the host 300 and the commands are then supplied to the command interpreting unit 14. The command interpreting unit 14 interprets the commands so that the commands can be understood by the animation engine 15. The interpreted commands are supplied to the animation engine 15. The animation engine 15 makes an animation in which respective objects are moved in the virtual space, based on animation data for the "abator" and other objects in the virtual space which animation data stored in the animation database 16. The display controller 17 controls the display unit 3 so that the animation is displayed on the display unit 3.

In the electronic community system as described above, the user communicates with other users through the virtual space displayed on the display unit of the user terminal. Thus, a user suffering from an eyesight disorder cannot use the conventional electronic community system.

SUMMARY OF THE INVENTION

Accordingly, a general object of the present invention is to provide a novel and useful electronic community system in which the disadvantages of the aforementioned prior art are eliminated.

A specific object of the present invention is to provide an electronic community system in which a user suffering an eyesight disorder can communicate with another user through a virtual space formed on the computer network.

The above objects of the present invention are achieved by an electronic community system in which host and user terminals are connected so that a virtual space shared by the user terminals is formed based on information transmitted from the host to the user terminals, a state and events in the virtual space being controlled in accordance with commands input to the respective user terminals, the electronic community system comprising: first means, provided in at least one of the host and the respective user terminals, for analyzing commands input to the respective user terminals and generating information representing states and/or events in the virtual space; second means, provided in either the host or the respective user terminals, for converting the information generated by the first means into speech information; and speech output means, provided in the respective user terminals, for outputting a speech explaining the states and/or events in the virtual space based on the speech information obtained by the second means.

According to the present invention, the user can recognize the states and events in the virtual space formed in the system by speech. Thus, it is easy for the user suffering eyesight disorder to use the system.

BRIEF DESCRIPTION OF THE DRAWINGS

Other objects, features and advantages of the present invention will be apparent from the following detailed description when read in conjunction with the accompanying drawings, in which.

DESCRIPTION OF THE PREFERRED EMBODIMENTS

A description will now be given of embodiments of the present invention.

An electronic community system according to an embodiment of the present invention is formed in a communication system in which a host and a plurality of user terminals are connected to each other by a communication network as shown in FIG. 1. The host in this system has the same structure as that of the conventional system shown in FIG. 2.

Figure 4:
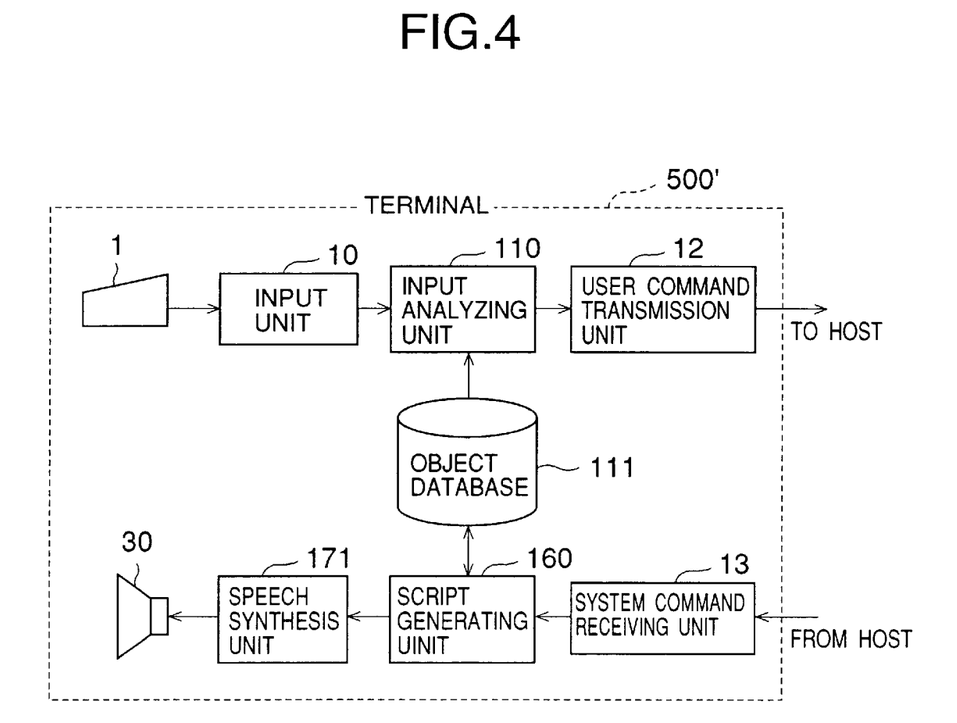
FIG. 4 is a block diagram illustrating an example of a user terminal in an electronic community system according to an embodiment of the present invention.

Each user terminal is formed as shown in FIG. 4. In FIG. 4, those parts which are the same as those shown in FIG. 2 are given the same reference numbers.

Referring to FIG. 4, a user terminal 500' has the keyboard 1, the input unit 10, the user command transmission unit 12 and the system command receiving unit 13 in the same manner as that in the conventional system. The user terminal 500' further has an input analyzing unit 110, an object database 111, a script generating unit 160, a speech synthesis unit 171 and a loudspeaker 30.

The host generates system commands describing states of objects (e.g., an "abator", walls, a floor, windows, a door, a chair, a doll, a newspaper and the like) in the virtual space, and transmits them to the respective user terminals. In a user terminal, the system commands are converted into scripts (indicating names of objects and states of the objects) as will be described later. Synthetic speech signals are then generated based on the scripts. The loudspeaker 30 is driven based on the synthetic speech signals so that a state (a scene) of the virtual space is explained by speech (e.g., "YOU ARE IN YOUR HOME." "YOU STANDS BESIDE A CHAIR LOCATED IN THE CENTER OF A ROOM." and the like).

The user hears the speech, uttered by the loudspeaker 30, explaining the scene of the virtual space. The user then specifies an object (e.g., an "abator") and inputs commands for specifying events, such as movement of the object and the speech, in the virtual space, using the keyboard 1. The object database 111 stores data representing names, positions and other attributes of objects in the virtual space which is to be formed on the computer network by the host. The input analyzing unit 110 analyzes input commands with reference to the object database 111. The analyzed commands are transmitted, as user commands, from the user command transmission unit 12 to the host.

The host analyzes the user commands from the respective user terminals and transmits to the respective user terminals system commands, corresponding to the user commands, for controlling the objects in the virtual space. In the respective user terminals, the system command receiving unit 13 receives the system commands from the host, and the received system commands are supplied to the script generating unit 160. The script generating unit 60 retrieves from the object database 111 the objects specified by the system commands and generates scripts describing states and/or movement of the objects (events, such as movement of the "abator", in the virtual space).

The scripts generated by the script generating unit 160, are supplied to the speech synthesis unit 171. The speech synthesis unit 171 is formed of a general speech synthesis software for generating synthetic speech corresponding to input scripts. That is, the speech synthesis unit 172 outputs synthetic speech signals corresponding to the scripts supplied from the script generating unit 16. The loudspeaker 30 is driven based on the synthetic speech signals so that the speech explaining states and movement of the objects in the virtual space is uttered from the loudspeaker 30.

Figure 5:
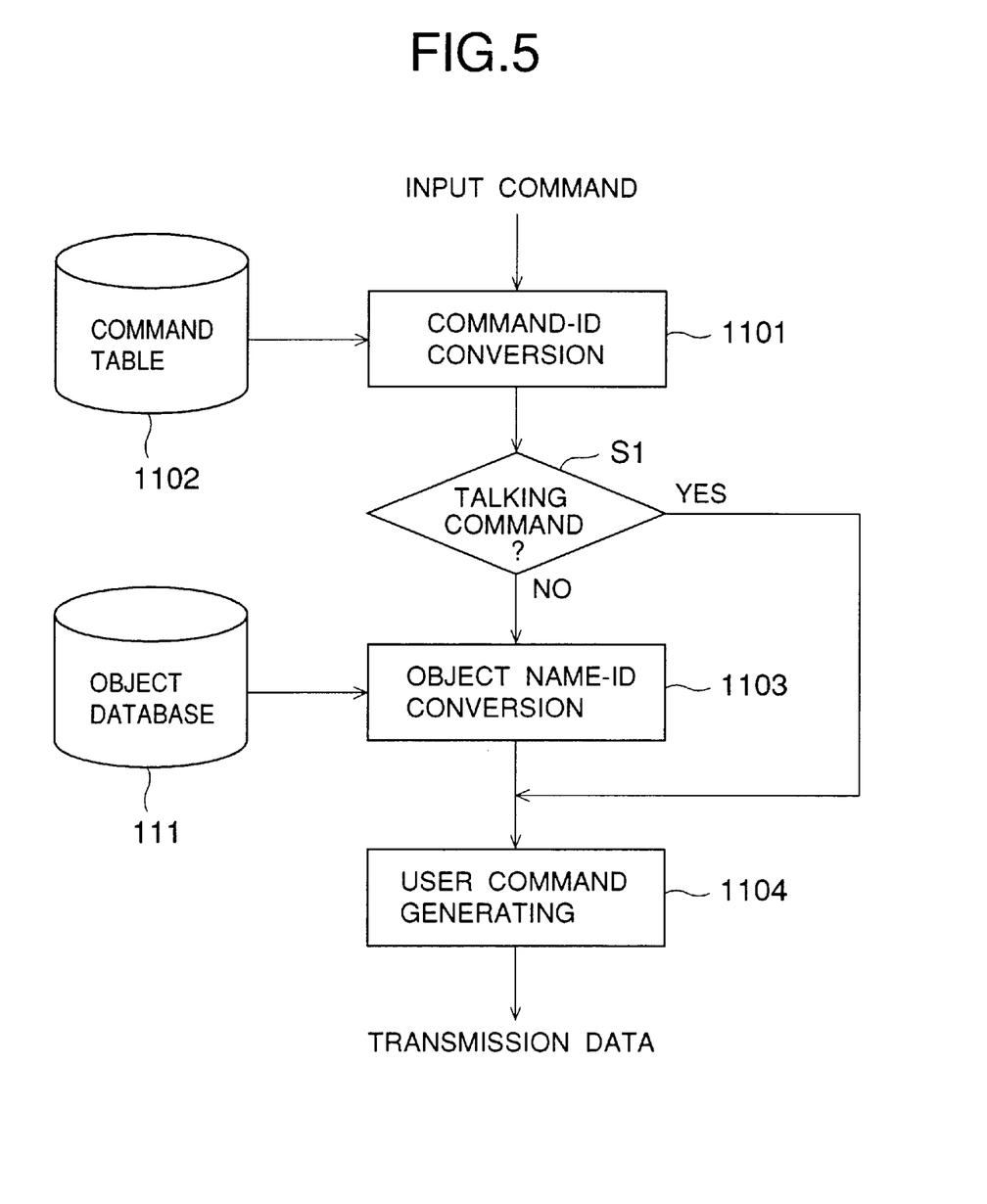
FIG. 5 is a diagram illustrating an example of a detailed functional constitution of an input analyzing unit of the user terminal shown in FIG. 4.

The input analyzing unit 110 is formed as shown in FIG. 5. Referring to FIG. 5, when a user inputs commands using keyboard 1 to move an "abator" for the user in the virtual space, a character string of the input command is supplied to a command converting portion 1101 via the input unit 10. The command converting portion 1101 converts the character string of the input command into a command ID with reference to a command table 1102. The command table 1102 indicates relationships between respective commands and command IDs identifying the commands.

The user commands are input as the following character strings (input commands).

(1) "GO TO DOOR"

(2) "PUT DOLL"

(3) "PICK NEWSPAPER"

(4) "SAY "GOOD DAY""

In the system in which the above commands are acceptable, the command table 1102 is formed as indicated in Table-1.

TABLE 1

| COMMAND | COMMAND ID |
| --- | --- |
| GO TO | 0x0001 |
| PUT | 0x0002 |
| PICK | 0x0003 |
| SAY | 0x0004 |

The command converting portion 1101 converts the command into a command ID with reference to the command table 1102 indicated in Table-1. It is then determined whether the command ID obtained by the command converting portion 1101 is a talking command (e.g., "SAY") (S1). If the command ID is not a talking command, the object converting portion 1103 converts an object name included in the input command identified by the command ID into an object ID with reference to the object database 111. The object database 111 indicates relationships between object names and object IDs as shown in Table-2.

TABLE 2

| REGION-ID | OBJECT NAME | OBJECT ID |
| --- | --- | --- |
| 0x1000 | NEWSPAPER | 0x0001 |
| 0x1000 | DOOR | 0x0011 |
| 0x1000 | DOLL | 0x0012 |
| 0x1000 | YOU | 0x0007 |
| 0x1000 | CAT BOY | 0x0008 |

In Table-2, "REGION-ID" indicates a region in which an object is located in the virtual space.

After the character string of the input command is converted into the command ID and the object name included in the input command is converted into the object ID, a user command generating portion 1104 generates a user command into which the respective IDs are integrated.

For example, when the above commands (1), (2) and (3) representing movements, the following user commands having a format in which terms ("ABATOR"), (REGION), (COMMAND) and (OBJECT) are integrated with each other in this order.

| | ("ABATOR") | (REGION) | (COMMAND) | (OBJECT) |
| --- | --- | --- | --- | --- |
| (1) | 0x0008 | 0x1000 | 0x0001 | 0x0011 |
| (2) | 0x0007 | 0x1000 | 0x0002 | 0x0012 |
| (3) | 0x0007 | 0x1000 | 0x0003 | 0x0010 |

In a case where the command ID identifies a talking command, such as (4) "SAY", the user command generating portion 1104 generates a user command using the command ID (0x0004). When the above talking command (4) is input to the system, a user command having a format in which terms ("ABATOR"), (REGION), (COMMAND) and (DATA) indicating contents of talking are integrated with each other is generated as follows.

| | ("ABATOR") | (REGION) | (COMMAND) | (DATA) |
| --- | --- | --- | --- | --- |
| (4) | 0x0007 | 0x1000 | 0x0004 | "good day." |

The user commands generated as described above are supplied to the user command transmission unit 12 and transmitted from the user command transmission unit 12 to the host.

The host analyzes the user commands transmitted from the user terminal and returns to the user terminals corresponding system commands for controlling objects in the virtual space. When it is determined, based on the analyzed results of the user commands, that the objects identified by the user commands can be moved in the virtual space without contradictions, the system commands has the same contents as the user commands.

Figure 6:
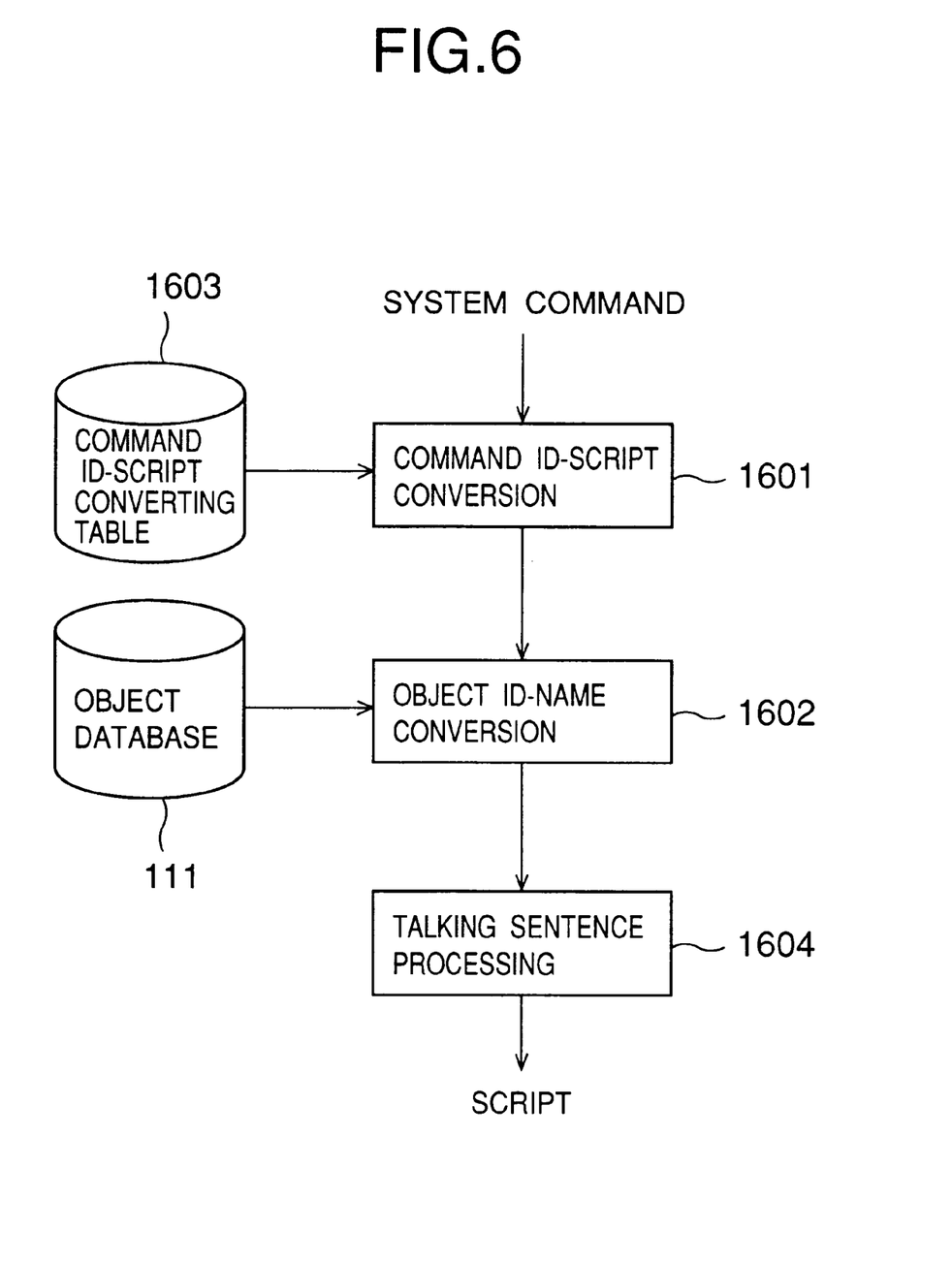
FIG. 6 is a diagram illustrating an example of a detailed functional constitution of a script generating unit of the user terminal shown in FIG. 4.

The script generating unit 160 of the user terminal 500' is formed as shown in FIG. 6.

Referring to FIG. 6, the system command received by the system command receiving unit 13 is supplied to a command ID converting portion 1601. The command ID converting portion 1601 converts a command ID included in the system command into a script with reference to a command ID converting table 1603.

For example, the system commands corresponding to the user commands (1), (2), (3) and (4) described above have the same contents as the user commands as follows.

| | ("ABATOR") | (REGION) | (COMMAND) | (OBJECT) |
| --- | --- | --- | --- | --- |
| (1) | 0x0008 | 0x1000 | 0x0001 | 0x0011 |
| (2) | 0x0007 | 0x1000 | 0x0002 | 0x0012 |
| (3) | 0x0007 | 0x1000 | 0x0003 | 0x0010 |
| | ("ABATOR") | (REGION) | (COMMAND) | (DATA) |
| (4) | 0x0007 | 0x1000 | 0x0004 | "good day." |

In the user terminal 500' in which the above system commands can be processed, the command ID converting table 1603 is formed as shown in Table-3.

TABLE 3

| COMMAND ID | SCRIPT |
| --- | --- |
| 0x001 | GO TO |
| 0x002 | PUT |
| 0x003 | HAVE |
| 0x004 | SAY |

When a command ID included in the system command is converted into a script with reference to the command ID converting table as described above, an object ID converting portion 1602 converts an object ID included in the system command into an object name with reference to the object database 111 having the contents indicated in Table-2. After this, a talking sentence processing portion 1604 synthesize the script obtained by the command ID converting portion 1601 and the object name obtained by the object ID converting portion 1602. As a result, a script (a sentence) corresponding to the system command from the host is generated.

For example, the following scripts (sentences) respectively corresponding to the above system commands (1), (2), (3) and (4) are generated.
 (1) "CAT BOY GOES TO DOOR"
 (2) "YOU PUT DOLL"
 (3) "YOU HAVE NEWSPAPER"
 (4) "YOU SAY "GOOD DAY""

The scripts generated as described above are supplied from the script generating unit 160 to the speech synthesis unit 171. The speech synthesis unit 171 generates speech signals corresponding to the scripts, and speech corresponding to the scripts are uttered from the loudspeaker 30. The user hears the speech and can recognize states of the respective objects, the movement of "abators" and conversation between "abators", in the virtual space.

Figure 7:
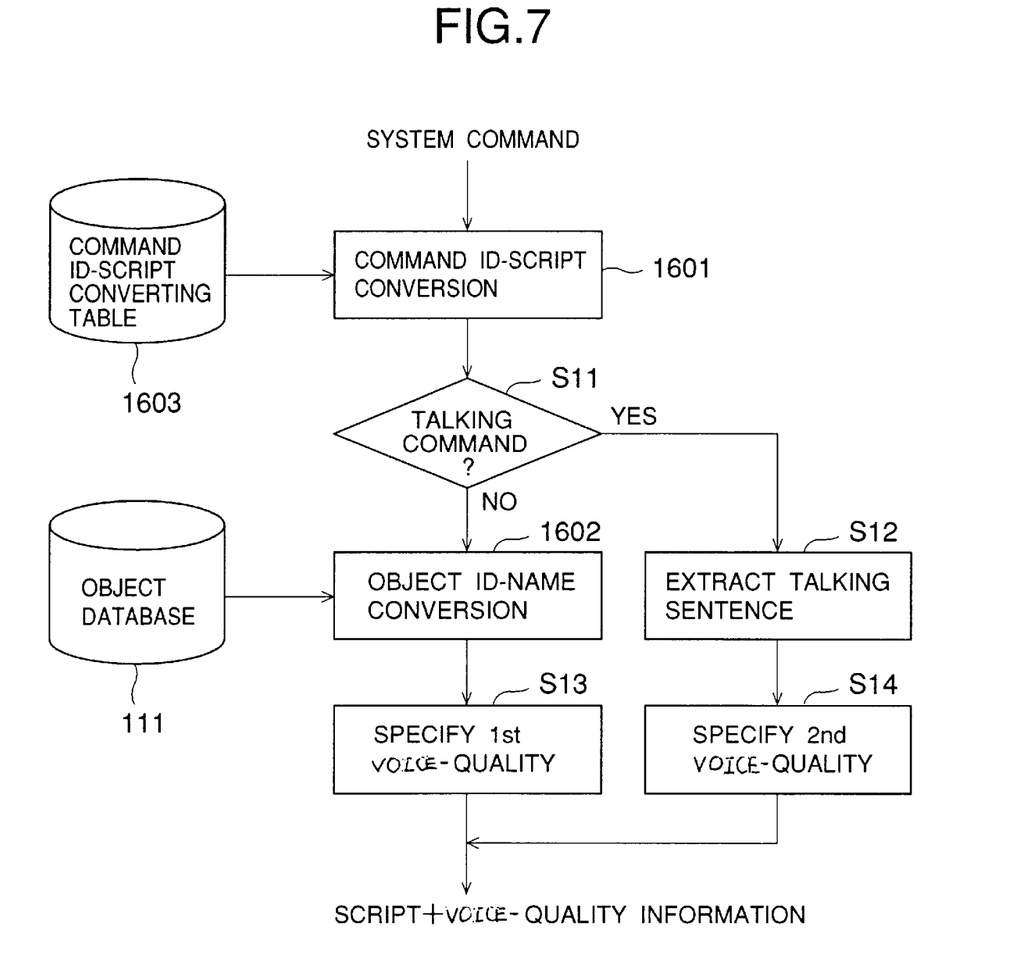
FIG. 7 is a diagram illustrating another example of a detailed functional constitution of the script generating unit.

The script generating unit 160 may be also formed as shown in FIG. 7. In this case, a voice-quality of speeches into which talking sentences are converted differs from a voice-quality of speeches into which sentences describing states of objects are converted.

Referring to FIG. 7, the command ID converting portion 1601 converts a command ID included in a system command into a script with reference to the command ID converting table 1603 in the same manner as in the above case. It is then determined whether or not the script represents a talking command (e.g., "SAY") (S11). When it is determined that the script is not the talking command, the object ID converting portion 1602 converts an object ID included in the system command into an object name with reference to the object database 111. The script obtained by the command ID converting portion 1601 and the object name obtained by the object ID converting portion 1602 is synthesized so that a script (a sentence) is generated. Voice-quality information specifying a first voice-quality (for example, corresponding to a woman's voice) is added to the script (the sentence) (S13).

On the other hand, if it is determined that the script is the talking command (S11), data (DATA) corresponding to a talking sentence is extracted from the system command (S12). The talking sentence is a script (a sentence), and voice-quality information specifying a second voice-quality (for example, corresponding to a man's voice) different from the above first voice-quality is added to the script (the sentence)(S14).

The speech synthesis unit 171 has a function for generating synthetic speech signals capable of representing a voice-quality corresponding to the voice-quality information. This function is known. The speech synthesis unit 171 converts the script (the sentence) into a synthetic speech signal with the voice-quality corresponding to the voice-quality information added to the script. As a result, a speech corresponding to the script (the sentence) is uttered from the loudspeaker 30 with the voice-quality specified by the voice-quality information.

According to the user terminal having the above script generating unit 160, speeches (narrations) explaining a scene of the virtual space and speeches (talking sentences) of the "abators" are heard with different tone qualities (the first voice-quality and the second voice-quality). Thus, the states and movement of the objects in the virtual space can be more clearly recognized.

Figure 8:
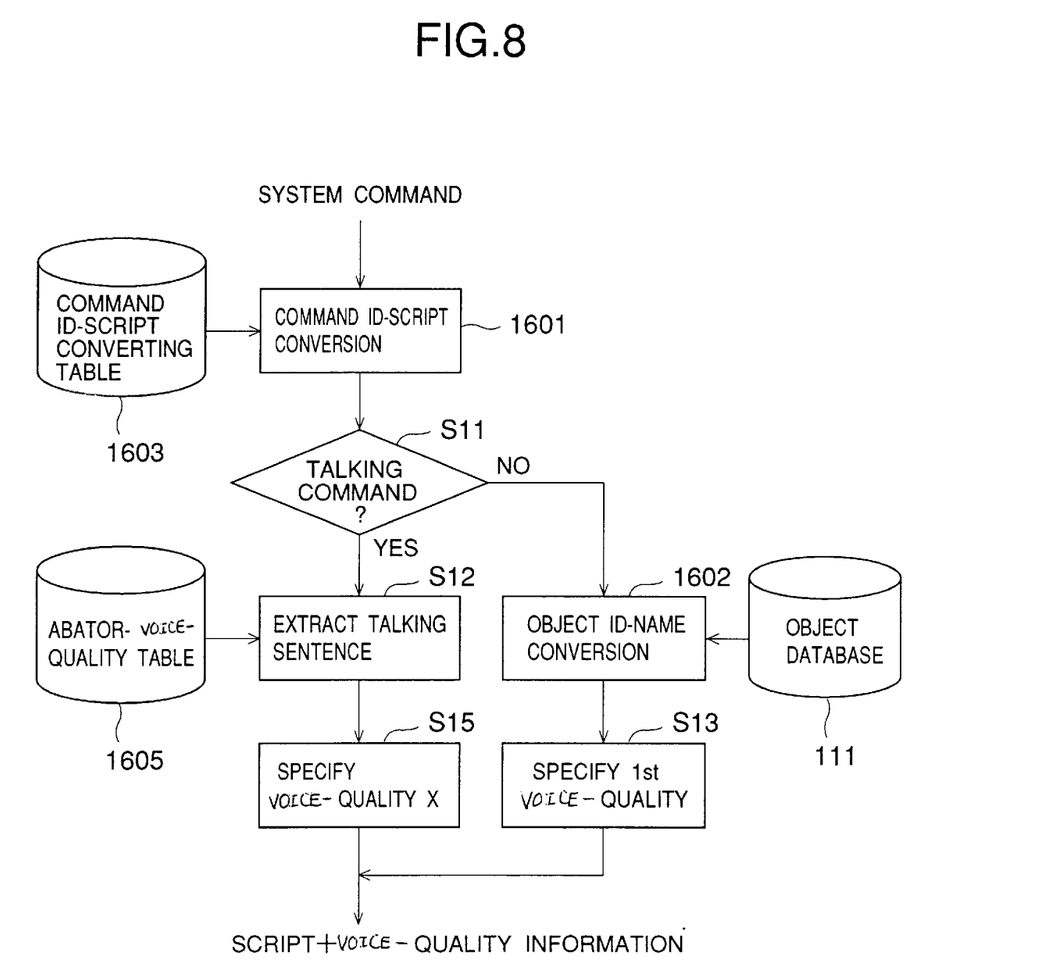
FIG. 8 is a diagram illustrating another example of a detailed functional constitution of the script generating unit.

FIG. 8 shows another example of the script generating unit 160. In this example, talking sentences and sentences representing the states of the objects are converted speeches having different tone qualities, and the voice-quality of the talking sentence is also changed in accordance with "abators".

Referring to FIG. 5, if it is determined that the script obtained by command ID converting portion 1601 does not correspond to the talking command (S11), a script (a sentence) into which the script obtained by command ID converting portion 1601 and an object name obtained by object ID converting portion 1602 are synthesized is generated. Voice-quality information specifying the first voice-quality is added to the script (the sentence) (S13).

On the other hand, if it is determined that the script obtained by the command ID converting portion 1601 corresponds to the talking command (S11), a talking sentence part of the system command is extracted from the system command and a script (a sentence) of the talking sentence part is generated (S12). An "abator" —voice-quality table 1605 indicating relationships between "abators" and tone qualities has been formed. With reference to the "abator"—voice-quality table 1605, a voice-quality X corresponding to an "abator" ID included in the system command is selected. Voice-quality information specifying the selected voice-quality X is added to the script (the sentence) of the talking sentence part. After this, the script generated by the script generating unit 160 is converted into a speech signal with the voice-quality represented by the voice-quality information added to the script by the speech synthesis unit 171.

According to the user terminal having the above script generating unit 160, tone qualities of the speeches depend on "abators". Thus, a scene in which "abators" are talking with each other can be easily recognized.

Figure 9:
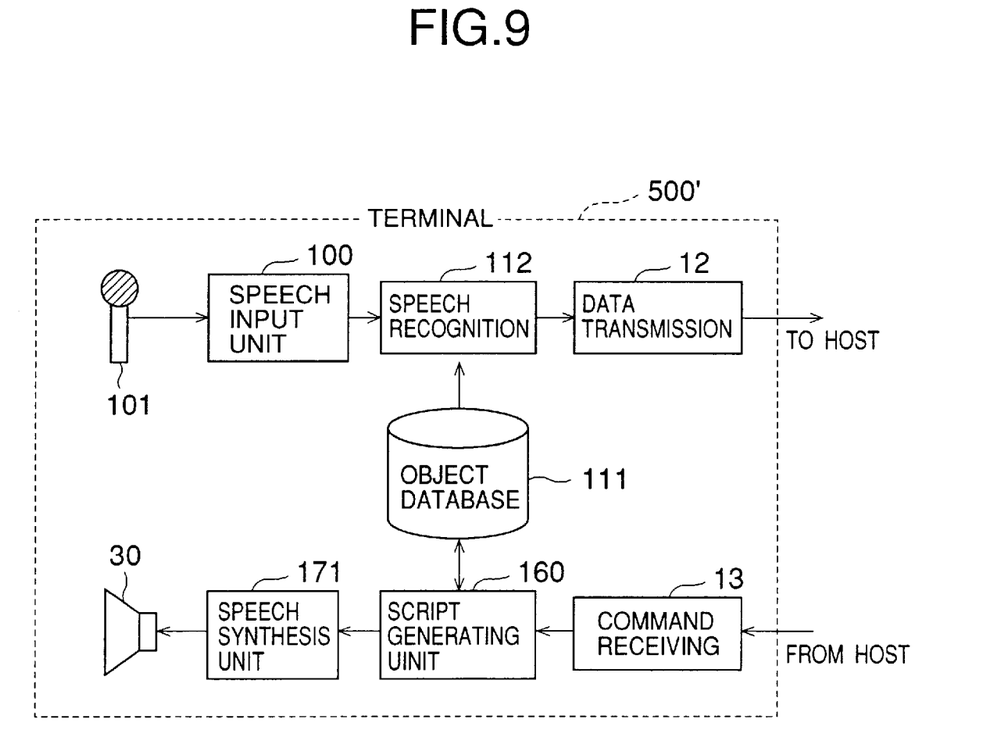
FIG. 9 is a block diagram illustrating another example of the user terminal in the electronic community system.

The user terminal may be also formed as shown in FIG. 9. In this case, a user can input command using a microphone instead of the keyboard 1.

Referring to FIG. 9, the user terminal has a microphone 101, an speech input unit 100 and a speech recognition unit 112 respectively instead of the keyboard 1, the input unit 10 and the input analyzing unit 110 shown in FIG. 4. The speech input unit 100 samples at predetermined intervals a speech signal corresponding to an input command input from the microphone 101 and generates a digital signal. The digital signal represents the input command. The speech recognition unit 112 converts, using a command table 1102, the digital signal into an command ID corresponding to the input command represented by the digital. As to commands other than the talking command, object names included in the commands are converted into object IDs using the object database 111. As a result, the user commands having the format as has been described above are generated in the same manner as in the above embodiment. The objects in the virtual space formed in the system are controlled in accordance with the user commands in the same manner as in the above embodiments.

According to the above embodiment, since the command can be input by use of speech, it is easy for a user suffering eyesight disorder to use the electronic community system.

In the above embodiments, the input analyzing unit and the script generating unit are provided in the each of the user terminals to distribute processes. However, functions of the input analyzing unit and the script generating unit may be provided in the host.

The present invention is not limited to the aforementioned embodiments, and other variations and modifications may be made without departing from the scope of the claimed invention.

What is claimed is:

1. An electronic community system in which a host and user terminals are connected so that a virtual space shared by said user terminals is formed based on information transmitted from said host to said user terminals, a state and events in the virtual space being controlled in accordance with commands input to respective ones of said user terminals, said electronic community system comprising:

analyzing means, provided in at least one of said host and said user terminals, for analyzing commands input to said user terminals and for generating information representing at least one of a state and an event in the virtual space, wherein said analyzing means comprises:

a object database storing information regarding objects which may be in the virtual space;

command information generating means for generating, from commands input to said user terminal, command information items representing contents of the commands using the information regarding the objects in said object database; and script generating means for generating, from the command information items generated by said command information generating means, scripts which are information representing said at least one of said state and the event in the virtual space;

converting means, provided in one of said host and said user terminals, for converting the information generated by said analyzing means into synthetic speech signals, wherein said converting means converts the scripts into the synthetic speech signals; and speech output means, provided in said user terminals, for outputting a speech explaining said at least one of said state and event in the virtual space based on the synthetic speech signals obtained by said converting means.

2. The electronic community system as claimed in claim 1, wherein said analyzing means is distributively provided in said host and said user terminals.

3. The electronic community system as claimed in claim 1, wherein said converting means is provided in said user terminals.

4. The electronic community system as claimed in claim 1, wherein said converting means comprises speech synthesis means for converting the information representing said at least one of said states and events in the virtual space into speech signals in accordance with a speech synthetic process.

5. The electronic community system as claimed in claim 1, wherein said analyzing means includes voice-quality adding means for adding voice-quality information to the information representing said at least one of said states and events in the virtual space, the voice-quality information representing a voice-quality depending on each of said at least one of said states and events in the virtual space, and wherein said converting means converts the information representing said at least one of said states and events in the virtual space into the speech information having a voice-quality specified by the voice-quality information.

6. The electronic community system as claimed in claim 1, wherein each of said user terminal has speech input means for inputting the commands by speech.

7. An electronic community system in which a host and user terminals are connected so that a virtual space shared by said user terminals is formed based on information transmitted from said host to said user terminals, a state and events in the virtual space being controlled in accordance with commands input to respective ones of said user terminals, said electronic community system comprising:

an analyzer to analyze commands input to said user terminals and to generate information representing at least one of a state and an event in the virtual space, said analyzer being provided in at least one of said host and said user terminals;

a convertor to convert the information generated by said analyzer into speech information, said convertor being disposed in one of said host and user terminals; and a speech output unit to output a speech explaining said at least one of said state and event in the virtual space based on the speech information obtained by said convertor, the speech output unit being disposed in said user terminals.

8. The electronic community system as claimed in claim 7, wherein said voice-quality adding means adds different voice-quality information items to information items representing conversation performed between objects in the virtual space based on the commands input to said user terminals.

9. The electronic community system as claimed in claim 7, wherein said voice-quality adding means adds the voice-quality information to the information representing a speech of an object in conversation performed in the virtual space, the voice-quality information depending on the object.

* * * * *